Figure 1:
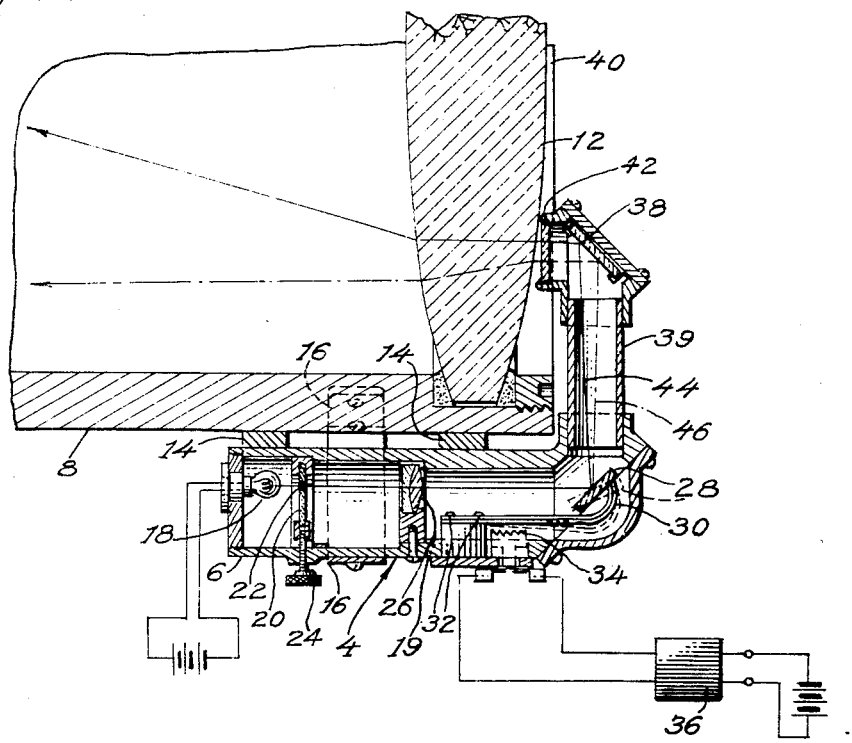

Aug. 14, 1956 R. E. ULRICH 2,758,499

APPARATUS FOR OSCILLATING A RADIANT BEAM

Filed Oct. 29, 1952

INVENTOR.
ROBERT E. ULRICH
BY George Lipkin
ATTORNEYS

United States Patent Office 2,758,499
Patented Aug. 14, 1956

2,758,499

APPARATUS FOR OSCILLATING A RADIANT BEAM

Robert E. Ulrich, Riverton, N. J., assignor, by mesne assignments, to the United States of America as represented by the Secretary of the Navy Application October 29, 1952, Serial No. 317,487

1 Claim. (Cl. 88—1)

This invention relates to optical devices, and more particularly to calibrating apparatus for use with these devices.

In the calibration and testing of optical devices, such as in collimating such devices or in determining their optical fields, I have found it necessary to utilize a target that is scanned across the optical path and onto a light sensitive surface in the device, which surface may be the human eye, a photographic film or a light responsive electric cell. I provide a light or heat source as the target which is reflected into the optical device by means of a light deviating medium that is moveably mounted to furnish the necessary scanning movement of the target. The conventional mechanism, such as an electro-magnet for furnishing the desired oscillating movement, is not suitable for use in this type of apparatus that is to be attached to the housing or barrel of the optical device, because of the excessive weight, the space required, the presence of mechanically moveable parts which may vibrate the device, and the inadequacy of control over the movement that is available with an electro-mechanical mechanism.

I have discovered that by the use of a heat responsive means, such as a bimetallic strip, I can actuate the light deviating medium to obtain the required oscillations of the target without any of the above described disadvantages. Accordingly, a principal object of this invention is to provide an optical calibrating apparatus that is operated by heat responsive means.

Further objects of this invention is to provide a calibrating apparatus that is light weight; to provide such an apparatus that occupies a minimum of space, which, if desired, will permit the apparatus to be permanently attached to the optical device; and to provide a calibrating apparatus that is simple in operation, and which has a fine degree of control over target movement.

These and other objects will become apparent from the drawings and the detailed description of the invention.

The objects of this invention are accomplished by providing a calibrating apparatus which may be attached to the housing or barrel of the optical device. The apparatus contains a light or heat source which forms an image that is reflected by a moveable light deviating medium, preferably a surface mirror, into the aperture of the device and across its optical path. The light deviating medium is preferably mounted on the free end of a heat responsive means such as a bimetallic strip which is operated by a heat source to provide the necessary movement of the image. A pulsating device may be utilized to furnish an accurate control over the heat source and to obtain an oscillating movement of the bimetallic strip, thereby scanning the target across the optical path. In order to provide a more compact unit when attached to the optical device and also to present a minimum obstruction across the aperture of the optical device, a second light deviating medium fixedly mounted in the apparatus may be utilized which permits the light source and the mounting for the moveable light deviating medium to be positioned longitudinally along the exterior wall of the optical device. An adjustable aperture may be provided adjacent the light source to vary the radiation output.

Figure 2:
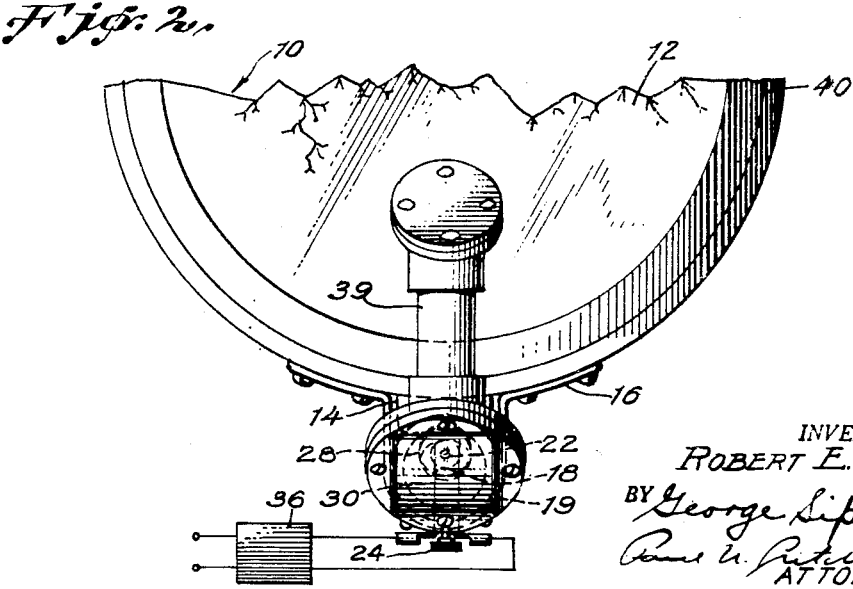

In the drawings:

Fig. 1 is a partial section of an optical device with the calibrating apparatus attached in operating position, and Fig. 2 is a partial end view of the optical device and attached calibrating apparatus.

In the accompanying drawing, the calibrating apparatus 4 comprises a tubular casing 6 fixedly secured to the exterior wall of the barrel 8 of an optical device 10 by means of spaced blocks 14 and a metal strap 16 which clamps around the barrel. A light or heat source 18 is mounted within one end of horizontal portion 19 of the casing to furnish a target the image of which is reflected through the lens 12 of the optical device and across the optical path onto a sensitive surface, not shown, which may be, as previously described, the operator's eye, a photographic film or a light responsive electric cell.

An apertured plate 20 is fixed within the casing adjacent light source 18 and is provided with variable opening 22, adjustable in size by rotation of thumb screw 24, for varying the radiation output of the light source. A lens 26 is mounted within the casing spaced at its focal length from the light source for paralleling the light rays from source 18, the rays passing through opening 22 thus being directed on a light deviating medium 28, which preferably is a surface mirror because of its compactness as compared to a prism. To provide the necessary movement of the image of the light source across the optical path of the device 10, mirror 28 is moveably mounted in the casing to vary the angle of the reflection mirror surface with respect to the light rays thereby causing their path to be correspondingly diverted.

It is a principal feature of this invention to move the mirror 28 by a heat responsive means that does not depend on a mechanical mechanism with moving parts. This is accomplished, in the preferred construction, by the use of a bimetallic strip 30 which is securely anchored at one end by bolts 32 to the interior of the casing end and rigidly supports mirror 28 on its free and expansible end. The bimetallic strip consists of two strips of dissimilar metals, such as brass and zinc, curved at their free end so that when heated and cooled by appropriate means cause a corresponding expansion and contraction movement, thereby imparting to mirror 28 a back and forth, or oscillating movement. Such movement changes the inclination with the longitudinal axis of the casing and the angle of reflection for the light rays. One of the advantages of this novel system is its simplicity for all that is needed to supply this heat source is a small heating element 34 that may be mounted within the casing adjacent the bimetallic strip. Heating element 34 may be connected to a key or pulsing device 36, such as a thermal contactor or electronic timer, which functions to interrupt the heating of the element and insure a controlled oscillation of mirror 28 and of the light image that it reflects. It is to be noted that the heating element may be a small coil and pulsing device 36 may be independently located from the casing, and these advantages contribute to the compactness and lightness of the calibrating apparatus.

A second mirror 38, or other light deviating medium, may be provided within a transversely extending portion 39 of the casing in a fixed position in front of and closely adjacent the aperture 40 of the optical device, mirror 38 being angularly set to reflect the vertically projected light rays from the moveable mirror 28 horizontally through lens 26 and across the optical path. By providing the L-shaped casing with the additional mirror 38, the major elements of the apparatus which require the longest and widest part of the casing may be placed in the horizontal portion, or long leg, of the casing that extends longitudinally along the barrel of the device, and the vertical extension, or short leg, may terminate in window 42 that may be narrow and small and which would block out a relatively small portion of the aperture of the device and make it possible to attach the calibrating apparatus permanently to the optical device. If the calibrating apparatus is made readily detachable for servicing several different sizes of optical devices, the transverse portion 39 of the casing is constructed of a length to insure that window 42 will be positioned somewhere in front of the apertures of the device and adjacent a portion of the lens.

The operation of the calibrating apparatus is believed to be obvious from the above description. In Fig. 1, two of the many paths of the oscillated light rays are diagrammatically represented by solid line 44 and dotted line 46 and correspond to the relative position of moveable mirror 28. If an infra red light is to be used as the light source, a silver chloride window 42 and front surface silver chloride mirrors 28 and 38 would be required.

The calibrating apparatus of this invention provides test equipment that is compact and light weight, which is an important consideration when it is to be used on optical devices where space requirements are usually restricted, and unimpaired visibility through the devices is a necessity. This novel construction is made possible by the use of a bimetallic strip as the actuating means for the moveable mirror, which furnishes the needed oscillation of the light rays that are to be scanned across the optical path of the device to be calibrated or tested. The bimetallic strip provides a smoother and more sensitive control in the movement of the mirror than was heretofore possible. The heat source for actuating the bimetallic strip may be a simple electric coil suitably controlled, if desired, through a remotely located timer that will give the desired automatic control. Advantageously, the actuating means for the moveable mirror is small and compact and does not contain any moving parts which might interfere with the use of the optical device, nor does it need frequent replacement. By using a second mirror housed in a narrow transverse portion of the casing extended across the aperture of the device the principal elements of the apparatus may be mounted in a longitudinal portion along the length of the optical device insuring that the optical device will have maximum visibility making it possible to mount the calibrating apparatus on the device as a compact permanent fixture.

When this feature of compactness is not an important consideration, as for example if the apparatus is not to be permanently attached to the device the apparatus can be greatly simplified by omitting the fixed mirror and its corresponding portion of the casing, and by mounting the longitudinal portion transversely the aperture of the device, or removed 90° from its present illustrated position, in which construction moveable mirror 28 would replace the fixed mirror and be positioned in the same location.

Obviously many modifications and variations of the present invention are possible in the light of the above teachings. It is, therefore, to be understood that within the scope of the appended claim the invention may be practiced otherwise than as specifically described.

I claim:

An instrument for calibrating an optical device having a lens, said instrument comprising an angularly-bent tubular frame member provided at one end with a window, said frame member being adapted to be fitted onto said optical device with the window adjacent to and facing said lens, a light source mounted in the opposite end of said tubular frame member, a bimetallic element disposed between said ends near said angular bend, a first reflector carried by said bimetallic member, a second reflector mounted near said window for receiving light rays from said first reflector and reflecting them through said lens, means for focusing light rays emanating from said light source onto said first reflector for transmittance to said second reflector, an electric heater coil mounted on said frame beneath said bimetallic member, a control circuit for energizing said heater, said circuit comprising timing means adapted to control energization of said heater in a predetermined manner whereby an oscillating movement is imparted to said first reflector causing light rays reflected thereby to scan across the optical path of said optical device in accordance with the energization of said heater as determined by said timing means.

References Cited in the file of this patent

UNITED STATES PATENTS

| 160,401 | Dixwell | Mar. 2, 1875 |
| 2,365,361 | Street | Dec. 19, 1944 |
| 2,469,115 | Jagersberger | May 3, 1949 |
| 2,556,870 | Clark | June 12, 1951 |

FOREIGN PATENTS

| 599,578 | Great Britain | Mar. 16, 1948 |